United States Patent
Van Osten et al.

(10) Patent No.: US 10,496,657 B2
(45) Date of Patent: Dec. 3, 2019

(54) DISPLAYING AN INTERACTIVE COMMUNICATION TIME SERIES

(71) Applicant: salesforce.com, inc., San Francisco, CA (US)

(72) Inventors: Robert Van Osten, San Jose, CA (US); Sean Patrick Lynch, Redwood City, CA (US); Matthew Burghoffer, Menlo Park, CA (US); Adam Evans, Redwood City, CA (US); Joseph Michael Chrzanowski, Sunnyvale, CA (US); Adam McCormick Doti, Petaluma, CA (US); Leo Tenenblat, Hillsborough, CA (US)

(73) Assignee: salesforce.com, inc., San Francisco, CA (US)

( * ) Notice: Subject to any disclaimer, the term of this patent is extended or adjusted under 35 U.S.C. 154(b) by 120 days.

(21) Appl. No.: 15/451,051

(22) Filed: Mar. 6, 2017

(65) Prior Publication Data

US 2018/0253195 A1    Sep. 6, 2018

(51) Int. Cl.
*G06F 16/2458* (2019.01)
*H04L 29/08* (2006.01)
*G06F 16/26* (2019.01)
*G06F 3/0484* (2013.01)

(52) U.S. Cl.
CPC ...... *G06F 16/2477* (2019.01); *G06F 3/04847* (2013.01); *G06F 16/26* (2019.01); *H04L 67/22* (2013.01)

(58) Field of Classification Search
CPC .......................... G06T 11/206; G06F 16/2462
See application file for complete search history.

(56) References Cited

U.S. PATENT DOCUMENTS

| | | | |
|---|---|---|---|
| 9,553,922 B1* | 1/2017 | Guarraci | H04W 4/21 |
| 2007/0005296 A1* | 1/2007 | Beresniewicz | G06F 11/328 |
| | | | 702/181 |
| 2007/0288460 A1* | 12/2007 | Teramoto | G06F 17/30964 |
| 2010/0145771 A1* | 6/2010 | Fligler | G06Q 10/10 |
| | | | 705/319 |
| 2011/0106589 A1* | 5/2011 | Blomberg | G06Q 10/063 |
| | | | 705/7.39 |
| 2015/0134512 A1* | 5/2015 | Mueller | G06Q 20/4016 |
| | | | 705/39 |
| 2016/0301709 A1* | 10/2016 | Hassanzadeh | H04L 63/1433 |
| 2017/0061315 A1* | 3/2017 | Leonard | G06N 7/005 |
| 2017/0098120 A1* | 4/2017 | Bostick | G06K 9/00288 |
| 2017/0220672 A1* | 8/2017 | Sainani | G06F 17/18 |
| 2017/0220938 A1* | 8/2017 | Sainani | G06N 5/04 |

* cited by examiner

*Primary Examiner* — Justin S Lee
(74) *Attorney, Agent, or Firm* — Holland & Hart LLP

(57) ABSTRACT

A system may process and display communications data to a user. The system may receive data related to a time series of communication moments. The communication moments may include a property of a communication event that was derived based on an analysis of the communication event. The system may process the data to generate aggregate type information corresponding to one or more types of the communication moments. The system may display the communication moments and the aggregate type information to a user.

19 Claims, 12 Drawing Sheets

US 10,496,657 B2

DISPLAYING AN INTERACTIVE COMMUNICATION TIME SERIES

FIELD OF TECHNOLOGY

The present disclosure relates generally to database systems and communication data processing, and more specifically to displaying an interactive communication time series through communication data processing.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

The cloud platform may process and store the communications associated with various CRM interactions in a database. Due to the volume and variety of communications associated with a particular interaction, it may be difficult to determine what occurred over the course of an interaction, what impact the communications had on the outcome of the interaction, and how to improve future interactions.

DETAILED DESCRIPTION

A typical interaction between a customer and a business may involve dozens or even thousands of communications of various types (e.g., emails, phone calls, text messages, social media messages). An interaction may also involve several different parties communicating simultaneously (e.g., several sales representatives working for one customer). Because of the volume and variety of communications and number of communicating entities, it may be difficult for a user (e.g., a sales manager) to determine what is occurring over the course of one or more interactions, how the communications are impacting the final outcome of the interaction, and how or when to intervene. These difficulties may arise, for example, because of the massive amount of communications being exchanged, the variety of communication mediums being used, the number of different entities communicating, the real-time nature of the communications, or a combination of these factors.

A computing system (e.g., a cloud platform) supporting customer relationship management (CRM) may process and store communications associated with an interaction between a customer and a business, for example. The system may support a user interface (UI) to show a real-time, interactive timeline of communications spanning over one or more interactions. In some cases, the interactive timeline may include communications associated with multiple conversations for a same opportunity or deal. The system may be configured to analyze the content of a communication to identify certain events or characteristics (e.g., moments or scores) associated with the communications. The UI may display the moments and scores in addition to the communications on the timeline. The system may filter and display a filtered set of communications—and corresponding filtered set of moments and scores—based on a search parameter, a time period, or some other filtering parameter input by a user. The system may also display a subset of data in a separate window alongside the timeline (e.g., an inspector window). The system may update the timeline dynamically as new communications are transmitted and received.

Aspects of the disclosure are initially described in the context of computing environments for communication data processing. Aspects of the disclosure are then illustrated and described with reference to process flow diagrams. Examples of UIs in accordance with aspects of the disclosure are then described. Aspects of the disclosure are further illustrated by and described with reference to apparatus diagrams, system diagrams, and flowcharts that relate to displaying an interactive communication time series.

Figure 1:
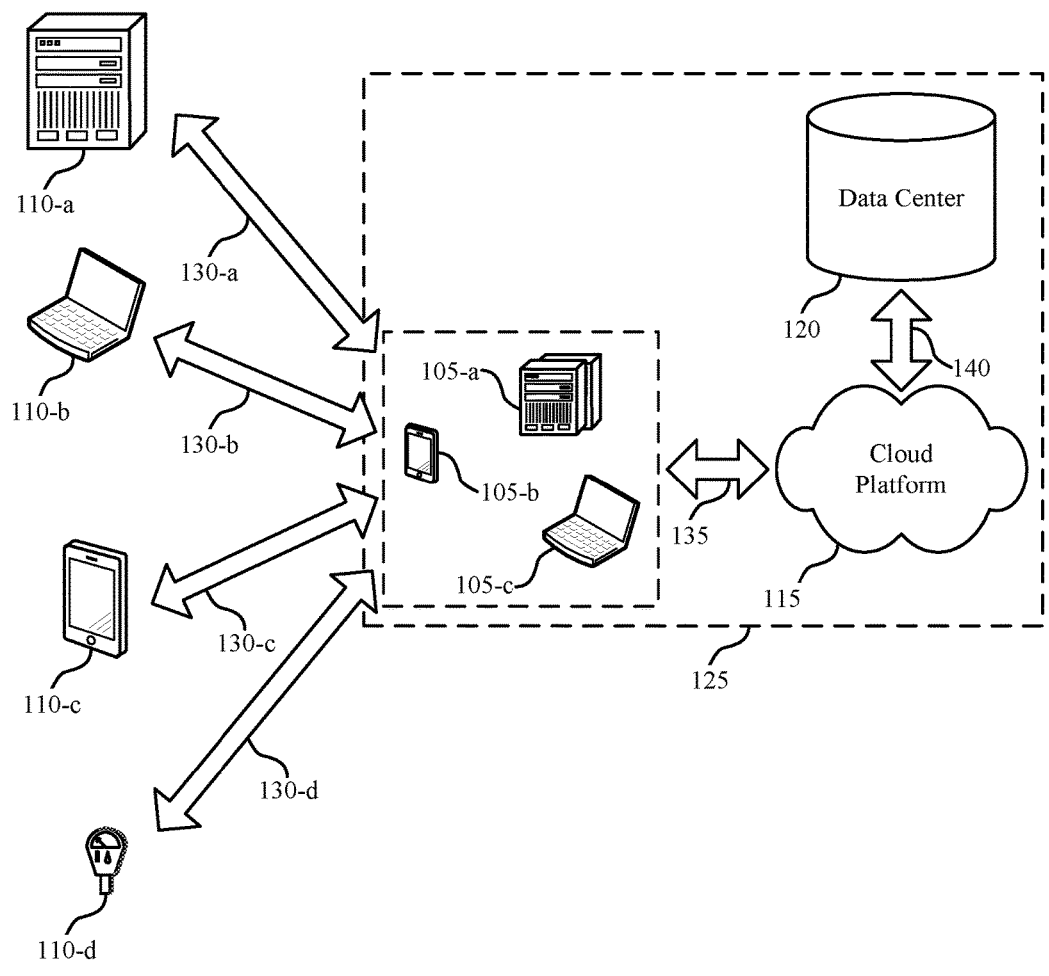
FIGS. 1 through 2 illustrate examples of an environment for communication data processing that support displaying an interactive communication time series in accordance with aspects of the present disclosure.

FIG. 1 illustrates an example of an environment 100 for cloud computing that supports displaying an interactive communication time series in accordance with various aspects of the present disclosure. The environment 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

System 125 may include cloud clients 105, cloud platform 115, and data center 120. In some cases, data processing may occur at any of the components of system 125, or at a combination of these components. In some cases, servers may perform the data processing. The servers may be a cloud client 105 or located at data center 120.

In accordance with aspects of the present disclosure, one or more components of system 125 may analyze the content of a series of communications to identify certain events or characteristics associated with the communications. System 125 may then process the communications to generate aggregate type information corresponding to the identified events or characteristics. The system 125 may also display on a UI the communications (e.g., on a timeline) and the aggregate type information (e.g., indications of moments and scores). The system 125 may accept user inputs to filter, scale, search, or otherwise manipulate the UI and may display an updated communication timeline and aggregate type information in response to the user inputs. The system 125 may therefore be configured to receive and process vast amounts of communications and display indications of what is occurring over the course of one or more interactions in a way that would not otherwise be apparent. Also, because the system 125 may be configured to update (e.g., filter) a UI based on inputs from a user, the system 125 may provide additional levels of granularity to a user reviewing the communications. Moreover, because the system 125 may be configured to receive, process, and display the communications in real time, a user may be able to detect an opportunity to intervene in an interaction in sufficient time to modify the outcome.

Figure 2:
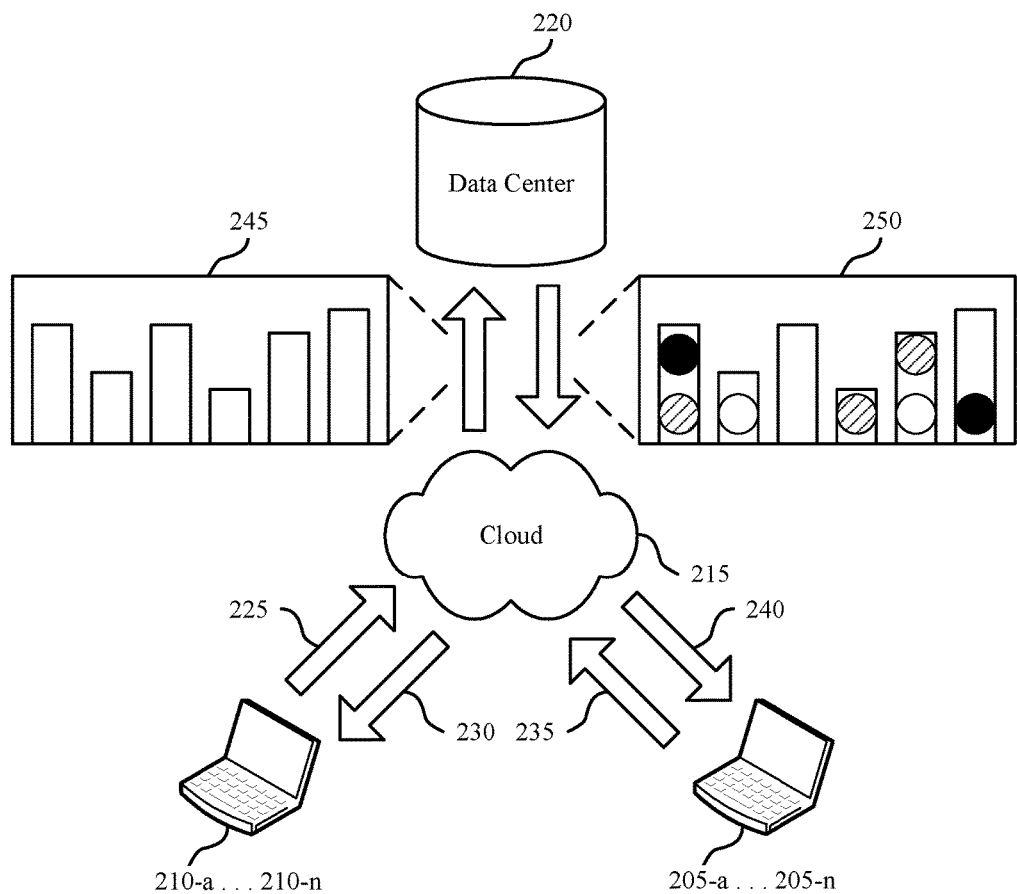
Figure 2:
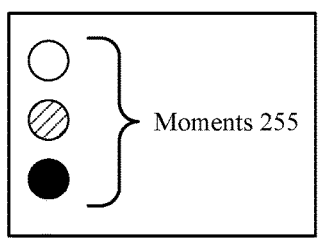

FIG. 2 illustrates an example of an environment 200 for communication data processing that supports displaying an interactive communication time series in accordance with various aspects of the present disclosure. The environment 200 includes cloud clients 205, contacts 210, cloud platform 215, and data center 220, which may be examples of the corresponding systems described with reference to FIG. 1. Environment 200 may include any number of cloud clients 205 and contacts 210 (e.g., cloud client 205-*a* to cloud client 205-*n*, and contact 210-*a* to contact 210-*n*). The cloud clients 205 or contacts 210 may be laptops, servers, smartphones, desktop computers, tablets, sensors, or other computing devices or systems capable of generating, analyzing, transmitting, or receiving communications.

Cloud client 205-*a* and contact 210-*a* may communicate over communication links 225, 230, 235, and 240, which may be examples of any wireless or wired data communication links. A communication may be an email, a calendar event, a service ticket, a short message service (SMS) text message, a voice call, a transcription of a voice call, a social media message, or any other form of electronic communication. Contact 210-*a* may transmit a first communication on communication link 225 to the cloud platform 215, and cloud client 205-*a* may receive the first communication on communication link 240. Additionally, cloud client 205-*a* may transmit a second communication on communication link 235, and contact 210-*a* may receive the second communication on communication link 230. In some examples, communications may be sent directly between contact 210-*a* and cloud client 205-*a* and then forwarded or otherwise shared with the cloud platform 215.

Cloud platform 215 may transmit communications to data center 220. The communications may be examples of communications transmitted or received by cloud client 205-*a*. As shown in graphical display 245, the communications may be represented as a bar graph, where the height of each bar indicates the number of communications over a given time period (e.g., hours, days, or weeks). Communications over a given period of time may be referred to as a time series of communications.

Data center 220 may perform analysis on a time series of communications (e.g., using natural language processing) to identify certain properties of a communication. For example, a communication may be analyzed to determine whether a specific event occurred during a communication or was otherwise associated with the communication. A communication may also be analyzed to determine A numerical assessment associated with a characteristic of the communication. These properties or a combination of these properties may be generally referred to as communication moments associated with a communication. In some examples, whether a particular event occurred may be referred to as a moment, whereas a numerical assessment of a communication may be referred to as a score. As shown in graphical display 250, the moments 255 may be illustrated as circles superimposed over the bar representing the communications that the moments 255 are associated with.

Moments may be designated by different types, as illustrated by the different fill patterns of the moments 255 in the graphical display 250. The different types of moments may include a competitor mention, a product mention, pricing mention, timing mention, specific member involvement, a specific attachment to the communication, scheduling of a meeting, rescheduling of a meeting, or any other occurrence associated with a communication. In some cases, a moment may be represented as a Boolean value. For example, data center 220 may set a moment to one value if it identifies that the specific event occurs, and may set the moment to a different value if it does not identify that the specific event occurs. Alternatively, data center 220 may not create a moment if it does not identify that the specific event occurred during a communication.

In some cases, data center 220 may perform analysis on the time series of communications (e.g., using natural language processing) to identify a numerical characterization of a communication. These numerical characterizations of communications may be referred to as scores associated with a communication. The score may also be referred to as a parametric score. In some examples, the score may be a value between 0 and 1. A communication may be analyzed and numerically assessed based on agreeability, tone, responsiveness, or any other measureable characterization of a communication. The information gleaned from the combination of moments and scores over the course of a time series of communications may be referred to as an insight.

In some examples, data center 220 may identify moments, scores, and insights from batches of data, which may be stored in a database at data center 220. In other examples, data center 220 may identify moments, scores, and insights dynamically (e.g., in real time) as communications are transmitted or received. The data center 220 may update the time series of communications as the communications are transmitted and received. The data center 220 may transmit the time series of communications, along with the identified moments, scores, and insights, to cloud client 205-*a* to display in a UI. As new communications are transmitted or received, data center 220 may transmit any updates to the time series of communications to cloud client 205-*a*. In some examples, cloud client 205-*a* or a server associated with cloud platform 215 may identify the moments, scores, and insights from a time series of communications based on communications transmitted and received by cloud client 205-*a*. In these examples, data center 220 may or may not receive or process the communications.

The data center 220 may further process the communications data to generate aggregate type information. The aggregate type information may be associated with a communication moments, scores, or some combination of moments and scores. In some examples, the aggregate type information may include a number of occurrences of a particular moment type, a periodicity of a particular moment type, a trend line corresponding to changes in a particular moment type (e.g., a score), or other information derived by aggregating identified moments or scores of a same type over a series of communications. The data center 220 may also transmit the aggregate type information to the cloud client 205. The cloud client 205 may display the aggregate type information to a user in a UI.

The UI on cloud client 205 may be configured to accept user input to modify the UI in some way. For example, as described in more detail below, the UI may accept an input from a user to filter or otherwise manipulate the visible portion of a communication timeline and any associated aggregate type information. The cloud client 205 may transmit this user input to the data center 220, where the data center 220 may process the input and generate updated aggregate type information and/or an updated communication timeline based on the user input. The data center 220 may then transmit the updated information to the cloud client 205 for display on an updated UI. In some examples, processing the user input and generating an updated communication timeline and aggregate type information may occur at the cloud client 205.

Figure 3:
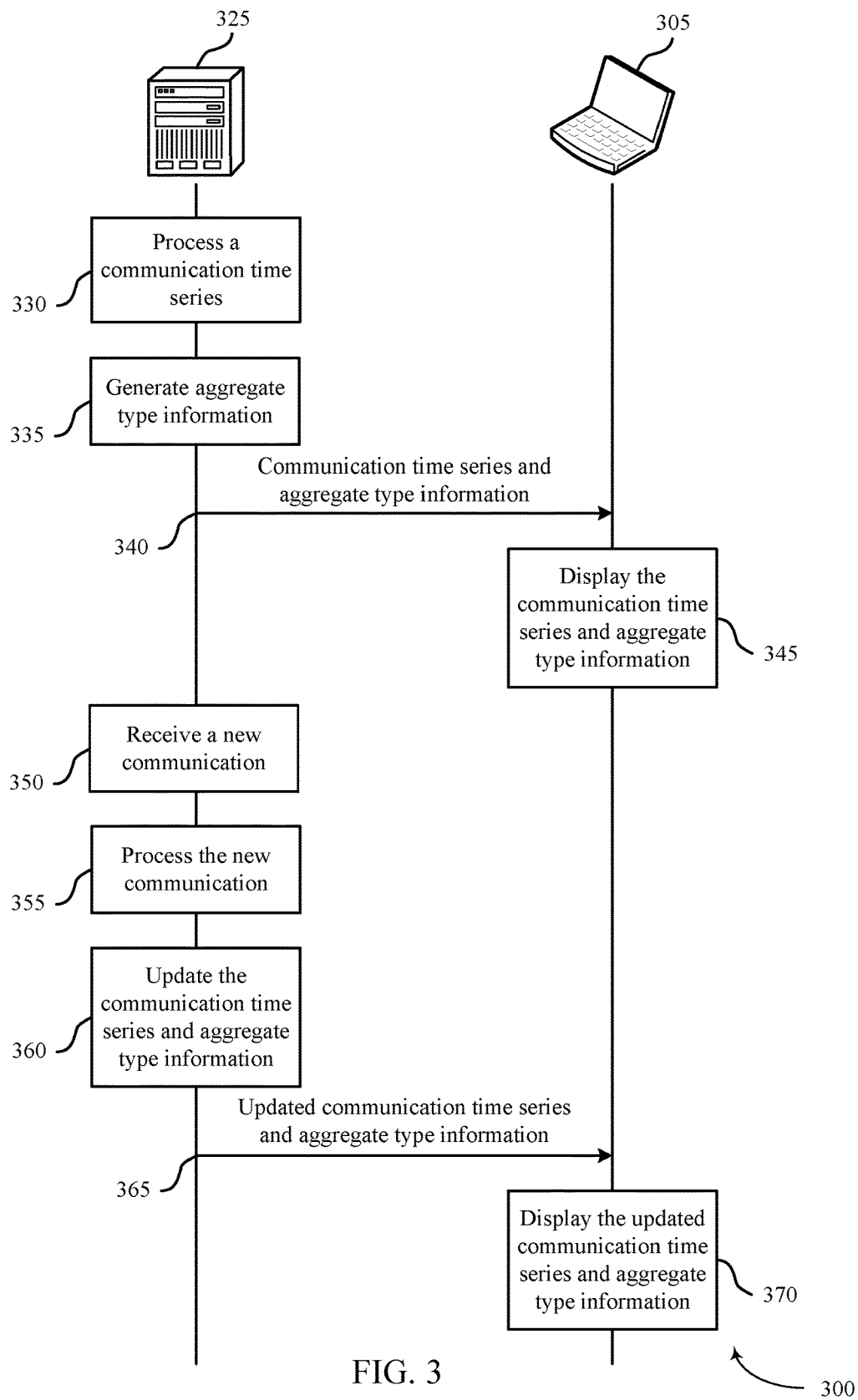
FIGS. 3 through 5 illustrate examples of process flows that support displaying an interactive communication time series in accordance with aspects of the present disclosure.

FIG. 3 illustrates an example of a process flow 300 for displaying an interactive communication time series in accordance with various aspects of the present disclosure. In some cases, UI 305 may be a component of a cloud client 105 or 205, as described with reference to FIGS. 1 and 2. The UI 305 may be an example of the UI 600 or 700, as described with reference to FIGS. 6 and 7. Server 325 may be a component of any part of system 125, as described with reference to FIG. 1. For example, server 325 may be part of a data center 120, a cloud platform 115, or a cloud client 105. In some cases, UI 305 and server 325 may be components of the same device. In some cases, the processes performed by server 325 may instead be performed by a user device (e.g., a smartphone, a laptop, a desktop computer, a tablet, a sensor, or another computing device or system capable of processing or analyzing communications).

At step 330, server 325 may process a communication time series. The communication time series may include communications stored in a database, communications recently transmitted or received, or a combination of the two. The processing may include identifying moments, scores, and outcomes within communications of the communication time series (e.g., using natural language processing).

At step 335, server 325 may generate aggregate type information. The aggregate type information may include information for a particular type of moment (e.g., a competitor mention, a product mention, an addition of a manager, etc.) or a particular type of score (e.g., agreeability, tone, responsiveness, etc.). In some examples, the aggregate type information may include an indication of a number of occurences of a particular type of moment, a periodicity of a particular type of moment, a trendline corresponding to changes over time in a particular type of score, or other information derived by aggregating identified moments or scores of a same type over a communication time series.

At step 340, server 325 may transmit the communication time series and aggregate type information to UI 305. The transmission may occur over wireless or wired data communication links. The communication time series may include indications of the identified moments, scores, and outcomes.

At step 345, UI 305 may display the received communication time series and aggregate type information. In some cases, displaying a communication time series and aggregate type information may include the functionality described with respect to UI 600 or UI 700 in FIGS. 6 and 7. As described in more detail below, a user may view the display and may interact with UI 305 by providing user inputs.

At step 350, server 325 may receive a new communication. The new communication may be an example of an email, calendar event, service ticket, short message service (SMS) text message, voice call, social media message, or another form of electronic communication.

At step 355, server 325 may process the new communication. The processing may be similar to the processing at step 330, and may include identifying moments, scores, and outcomes within the new communication. The processing may also include identifying a communication time series that the new communication is associated with. For example, the new communication may be associated with the communication time series that UI 305 is currently displaying.

At step 360, server 325 may update the communication time series and the aggregate type information based on processing the new communication. For example, the updated communication time series may include the new communication in addition to the communications previously associated with the communication time series. Updating the aggregate type information may include updating the number of occurences of a particular type of moment, the periodicity of a particular type of moment, the trendline corresponding to changes in a particular type of score, or other information derived by aggregating identified moments or scores of a same type within the communication time series. Server 325 may update the aggregate type information based on the moments, scores, or outcomes identified in the new communication.

At step 365, server 325 may send the updated communication time series and updated aggregate type information to UI 305. In some cases, server 325 may send data corresponding to the new communication to UI 305. Additionally or alternatively, server 325 may send data corresponding to the updated communication time series to UI 305. At step 370, UI 305 may display the updated communication time series and updated aggregate type information to a user.

Figure 4:
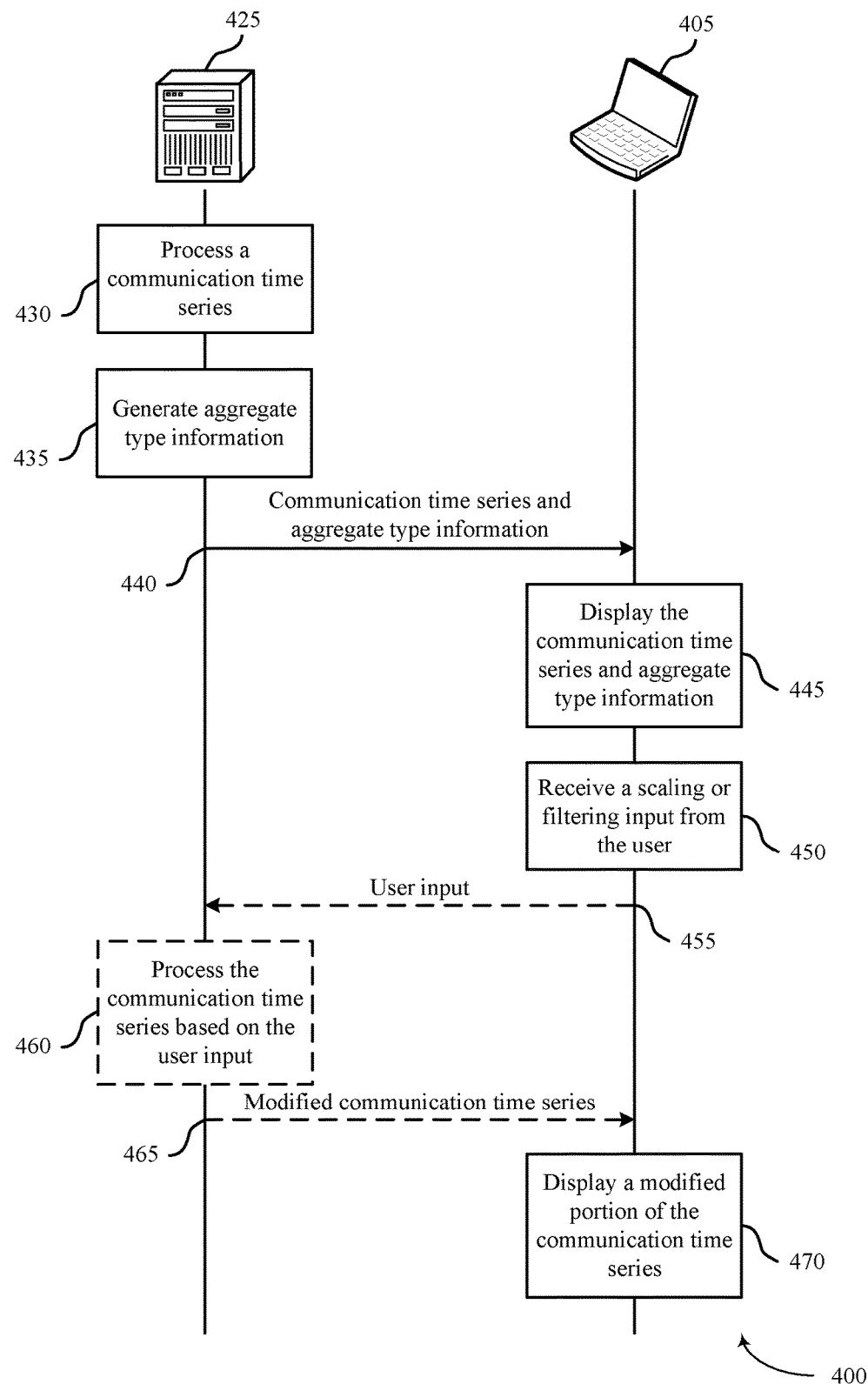

FIG. 4 illustrates an example of a process flow 400 for displaying an interactive communication time series in accordance with various aspects of the present disclosure. In some cases, UI 405 may be a component of a cloud client 105 or 205, as described with reference to FIGS. 1 and 2. The UI 405 may be an example of the UI 600 or 700, as described with reference to FIGS. 6 and 7. Server 425 may be a component of any part of system 125, as described with reference to FIG. 1. For example, server 425 may be part of a data center 120, a cloud platform 115, or a cloud client 105. In some cases, UI 405 and server 425 may be components of the same device. In some cases, the processes performed by server 425 may instead be performed by a user device (e.g., a smartphone, a laptop, a desktop computer, a tablet, a sensor, or another computing device or system capable of processing or analyzing communications).

At step 430, server 425 may process a communication time series. The communication time series may include communications stored in a database, communications recently transmitted or received, or a combination of the two. The processing may include identifying moments, scores, and outcomes within communications of the communication time series (e.g., using natural language processing).

At step 435, server 425 may generate aggregate type information. The aggregate type information may include information for a particular type of moment (e.g., a competitor mention, a product mention, an addition of a manager, etc.) or a particular type of score (e.g., agreeability, tone, responsiveness, etc.). In some examples, the aggregate type information may include a number of occurences of a particular type of moment, a periodicity of a particular type of moment, a trendline corresponding to changes over time in a particular type of score, or other information derived by aggregating identified moments or scores of a same type within the communication time series.

At step 440, server 425 may transmit the communication time series and aggregate type information to UI 405. The transmission may occur over wireless or wired data communication links. The communication time series may include indications of the identified moments, scores, and outcomes.

At step 445, UI 405 may display the received communication time series and aggregate type information. In some cases, the displaying may include the functionality described with respect to UI 600 or UI 700 in FIGS. 6 and 7. A user may view the display and may interact with UI 405 by providing user inputs.

At step 450, UI 405 may receive an input from the user. In some cases, the input may specify a particular time period (e.g., by entering a date range or sliding a bar over the timeline). In other cases, the input may specify a filtering parameter. For example, the filtering parameter may include a specific user associated with communications, a type of communication, an opportunity, whether the communication was successful or not, etc.

In some cases, UI 405 may process the input from the user and display a modified portion of the communication time series based on the user input without a call to server 425. In other cases, at step 455, UI 405 may send the user input to server 425 to perform further processing based on either the particular time period or the filtering parameter provided by the user. For example, at step 460, server 425 may process the communication time series based on the particular time period or the filtering parameter provided by the user. Server 425 may identify a set of communications of the communication time series that occurred during the particular time period or otherwise matching the filtering parameter. At step 465, server 425 may send the set of communications as a modified portion of the communication time series to UI 405.

At step 470, UI 405 may display the modified portion of the communication time series to the user. In some cases, UI 405 may receive further inputs from the user. UI 405 and server 425 may further modify the communication time series based on the received further inputs. Both the communication time series and the modified portion of the communication time series may update based on the transmission or reception of new communications. Correspondingly, UI 405 may automatically update the display of the communication time series or the modified portion of the communication time series based on the new communications.

Figure 5:
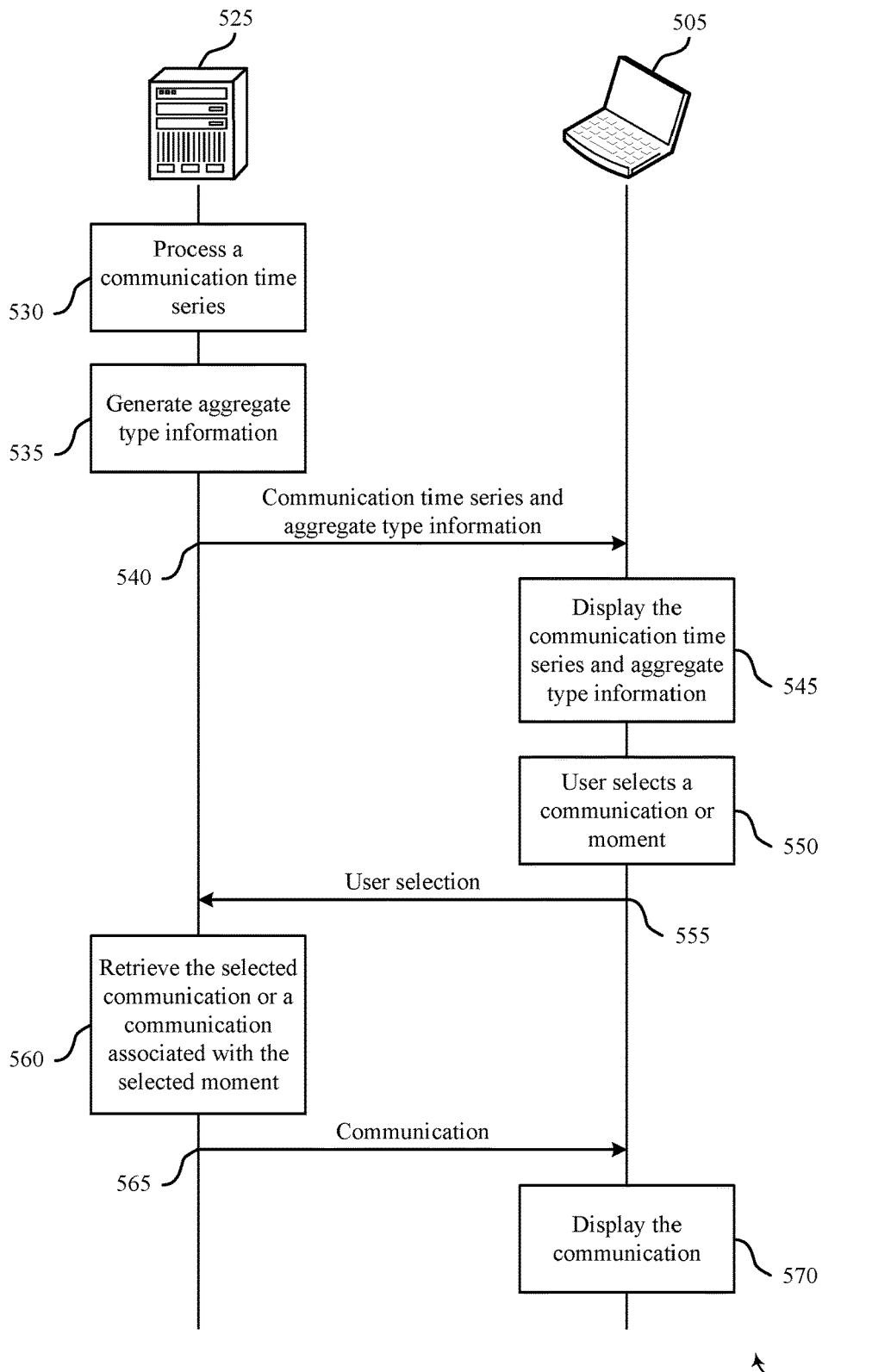

FIG. 5 illustrates an example of a process flow 500 for displaying an interactive communication time series in accordance with various aspects of the present disclosure. In some cases, UI 505 may be a component of a cloud client 105 or 205, as described with reference to FIGS. 1 and 2. The UI 505 may be an example of the UI 600 or 700, as described with reference to FIGS. 6 and 7. Server 525 may be a component of any part of system 125, as described with reference to FIG. 1. For example, server 525 may be part of a data center 120, a cloud platform 115, or a cloud client 105. In some cases, UI 505 and server 525 may be components of the same device. In some cases, the processes performed by server 525 may instead be performed by a user device (e.g., a smartphone, a laptop, a desktop computer, a tablet, a sensor, or another computing device or system capable of processing or analyzing communications).

At step 530, server 525 may process a communication time series. The communication time series may include communications stored in a database, communications recently transmitted or received, or a combination of the two. The processing may include identifying moments, scores, and outcomes within communications of the communication time series (e.g., using natural language processing).

At step 535, server 525 may generate aggregate type information. The aggregate type information may include information for a particular type of moment (e.g., a competitor mention, a product mention, an addition of a manager, etc.) or a particular type of score (e.g., agreeability, tone, responsiveness, etc.). In some examples, the aggregate type information may include a number of occurences of a particular type of moment, a periodicity of a particular type of moment, a trendline corresponding to changes over time in a particular type of score, or other information derived by aggregating identified moments or scores of a same type within the communication time series.

At step 540, server 525 may transmit the communication time series and aggregate type information to UI 505. The transmission may occur over wireless or wired data communication links. The communication time series may include indications of the identified moments, scores, and outcomes.

At step 545, UI 505 may display the received communication time series and aggregate type information. In some cases, the displaying may include the functionality described with respect to UI 600 or UI 700 in FIGS. 6 and 7. A user may view the display, and may interact with UI 505 by providing data inputs.

At step 550, UI 505 may receive an input from the user. The input may specify a selection of either a communication of the communication time series or a moment, score, or outcome associated with a communication of the communication time series. For example, the user may click on a communication displayed by UI 505 or a particular moment associated with a communication to view the actual communication.

At step 555, UI 505 may send the input to server 525. The input may include an indication of the selected communication, moment, score, or outcome. Server 525 may receive the input, and at step 560, may retrieve a communication based on the input. For example, if a communication was selected, server 525 may retrieve the selected communication (e.g., from a communication database). Server 525 may retrieve the communication in which the selected moment, score, or outcome was identified. At step 565, server 525 may send the retrieved communication to UI 505.

At step 570, UI 505 may display the retrieved communication. In some cases, UI 505 may display the retrieved communication and may not display the communication time series and aggregate type information. In other cases, UI 505 may display the retrieved communication in addition to the communication time series and aggregate type information. For example, the retrieved communication may be an email, and the UI 505 may display the email to the user. In some cases, the user may determine how moments, scores, or outcomes were identified by server 525 based on viewing the retrieved communication.

Figure 6:
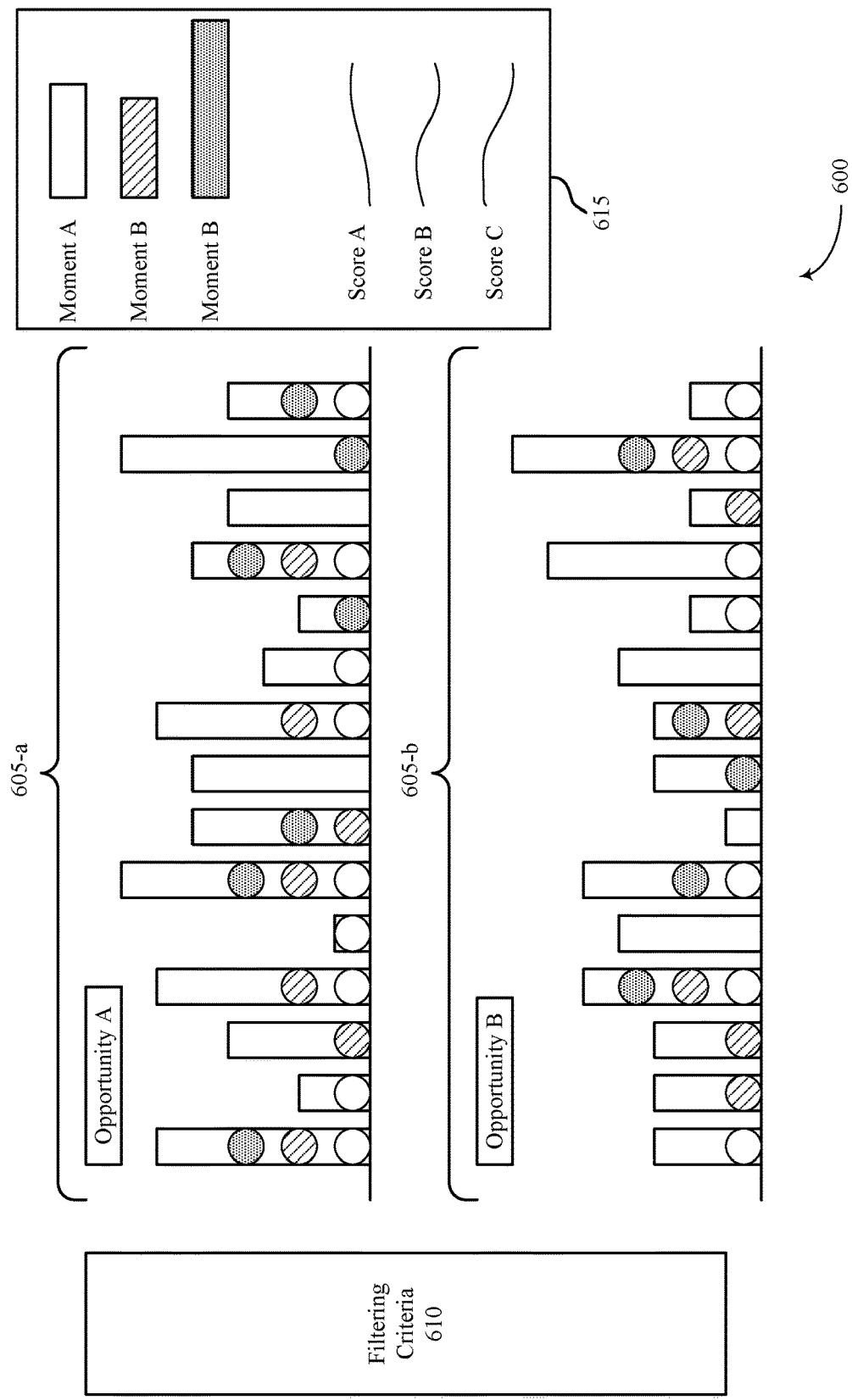
FIGS. 6 through 7 illustrate examples of user interfaces (UIs) that support displaying an interactive communication time series in accordance with aspects of the present disclosure.

FIG. 6 illustrates an example of a UI 600 that supports displaying an interactive communication time series in accordance with various aspects of the present disclosure. The UI 600 may include communications timelines 605-a and 605-b, a filtering criteria field 610, and an inspector 615. In some cases, the UI 600 may display fields, plots, or buttons in addition to the ones described. In other cases, the UI 600 may not display some of the fields or plots described. The UI 600 may be a component of a cloud client 205, as described with reference to FIG. 2.

The UI 600 may display one or more time series of communications for one or more interactions (e.g., for opportunity A and opportunity B). The communications may be examples of sales communications, service communications, marketing communications, or any other kind of communications associated with an interaction between a business and a customer. In some cases, the communications may be emails, calendar events, service tickets, short message service (SMS) text messages, voice calls, social media messages, or any other form of electronic communication. The UI 600 may display the communications along a communications timeline 605 according to a time that the communication was transmitted or received. The width of each bar along a timeline 605 may correspond to a time period (e.g., hours, days, or weeks). The height of each bar may correspond to the amount of communications occurring over the course of that time period. The UI 600 may automatically update the communications timeline 605 as new communications are transmitted or received. The set of communications may include stored communications, transmitted communications, received communications, or a combination of the above.

The UI 600 may also display properties of a communications (e.g., moments) superimposed on the timeline bar associated with communication. As described above, a system (e.g., the data center 220, the cloud platform 215, or the cloud client 205 as described with reference to FIG. 2) may identify specific events (e.g., competitor mentions, product mentions, pricing mentions, timing mentions, specific member involvement, specific attachments, scheduling meetings, rescheduling meetings, etc.) within a communication. For example, the system may create a moment based on identifying the specific events using natural language processing. In some examples, creating the moments may occur dynamically as the communications are transmitted or received. In other examples, creating the moments may occur on batches of stored previous communications. In some cases, the moments may be displayed as dots on the bars of the communications timeline 605 that are associated with the corresponding communications. Moments of different types may distinguished by different colors or fill patterns, as illustrated in UI 600. In some cases, a user may select a moment and may view the communication from which that moment was identified.

The UI 600 may also display aggregate type information associated with the moments in inspector 615. For example, the inspector 615 may display a bar for each moment type (e.g., Moment A, Moment B, and Moment C). In some examples, the length of each bar may indicate how many moments of that particular type occurred during a particular time period (e.g., the visible time period of a timeline 605). In this way, a user may be able to identify the communications that include moments of particular type, and may also see how many moments of that type occurred during a particular time period.

The UI 600 may also display numerical characterizations of communications (e.g., scores). As described above, a system (e.g., the data center 220, the cloud platform 215, or the cloud client 205 as described with reference to FIG. 2) may create a score based on a parameter (positivity or negativity, agreeability, tone, responsiveness, etc.) of the communication. In some cases, the score may be a ranking of the parameter or a ranking of how the parameter was calculated. The score may be a value between 0 and 1. In some examples, generating the scores may occur dynamically as the communications are transmitted or received. In other examples, generating the scores may occur on batches of stored previous communications. The UI 600 may display the scores. In some cases, the scores may be displayed graphically as a function of time (e.g., a trend line) within an inspector 615. The inspector 615 may display different trend lines for different types of scores. For example, Score A may represent agreeability, Score B may represent tone, and Score C may represent responsiveness. In one example, a user may select an interaction, and may view how a score went up or down during the lifetime of the interaction in the inspector 615.

The UI 600 may be configured to accept user input to manipulate (e.g., filter) the display of the UI 600 based on the user input. The filtered set of communications may be a subset of communications and communication moments, which may be a modified portion of a processed set of communications. The UI 600 may display the selected filtering criteria in a filtering criteria field 610. In some cases, the UI 600 may highlight the filtered set of communications. In other cases, the UI 600 may display the filtered set of communications on the communications timeline 605, and may not display communications that are not part of the filtered set of communications on the communications timeline 605. The UI 600 may also display moments and scores for the filtered set of communications, and may not display other moments and scores. In some examples, the filtering parameter may include a specific user associated with communications, a type of communication, a type of moment, an opportunity, whether the communication was successful or not, etc. In some examples, the search parameter may actually be a combination of parameters (e.g., successful sales for a specific user). In one case, the user may select a specific opportunity. The UI 600 may display communications associated with the selected specific opportunity in the communications timeline 605. The user may view how each conversation or set of conversations relates to the selected specific opportunity and a lifetime of an interaction (e.g., a particular deal).

The user may also scale (e.g., zoom in or out) the communications timeline 605 based on time, so that the UI 600 may display a set of communications for a specific time period. The set of communications for the specified time period may be a modified portion of a processed set of communications. For example, the user may provide an input (e.g., dragging a slider, inputting a date range) to modify a timescale of the communications timeline 605. In some cases, the modified timescale of the communications timeline 605 may display further granularity (e.g., if the scaling consists of zooming in on a time period). The further granularity may include displaying individual communications and the corresponding moments as bars, rather than displaying series of communications and the corresponding moments as bars. The further granularity may also include a more detailed display of scores or moments and how the scores or moments change over time in the set of communications for the specific time period. Furthermore, as the time period for a timeline 605 is scaled, the aggregate type information in inspector 615 may automatically adjust to correspond to the updated time period.

The UI 600 may also display user-specific information in the inspector 615. In some cases, the UI 600 may display the inspector 615 alongside the communications timeline 605. The user-specific information may be populated automatically or may be dynamically selected by a user. The user-specific information may include visual representations of moments, scores, aggregate type information based on moments or scores, or other data fields relevant to the communications timeline 605. In one example, the inspector 615 may display how many moments or scores of different types occur in relation to each other within a filtered set of communications (e.g., aggregate quantity information for each different moment type). A user may select one of these moments and the UI 600 may display the communication event (e.g., an email) associated with the selected moment. In another example, the UI 600 may display a grid of data corresponding to one of the relevant data fields in the inspector 615. Some examples of relevant data fields may include calculated fields based on the moments and scores, or intelligence fields based on incoming communications. In yet another example, the user-specific information may include a list of communications. For example, the list of communications may be a stream or a feed of communications that updates as communications are transmitted and received. The user may select a communication and the UI 600 may display the selected communication.

The UI 600 may facilitate a macro analysis of one or more time series of communications by a user or another system. The visualization enabled by the UI 600 may enable a user or system to determine if moments of a certain type are occurring at the appropriate times throughout a set of communications. Moreover, because the UI 600 may be configured to accept user input to modify the display, a user may be able to zoom in to a particular time period, focus on a particular customer (e.g., a particular opportunity), filter by moments of a particular type, or retrieve a communication associated with a particular moment. These manipulation capabilities of the UI 600 may facilitate additional levels of insight associated with a time series of communications that may not otherwise be apparent from the communications themselves.

Figure 7:
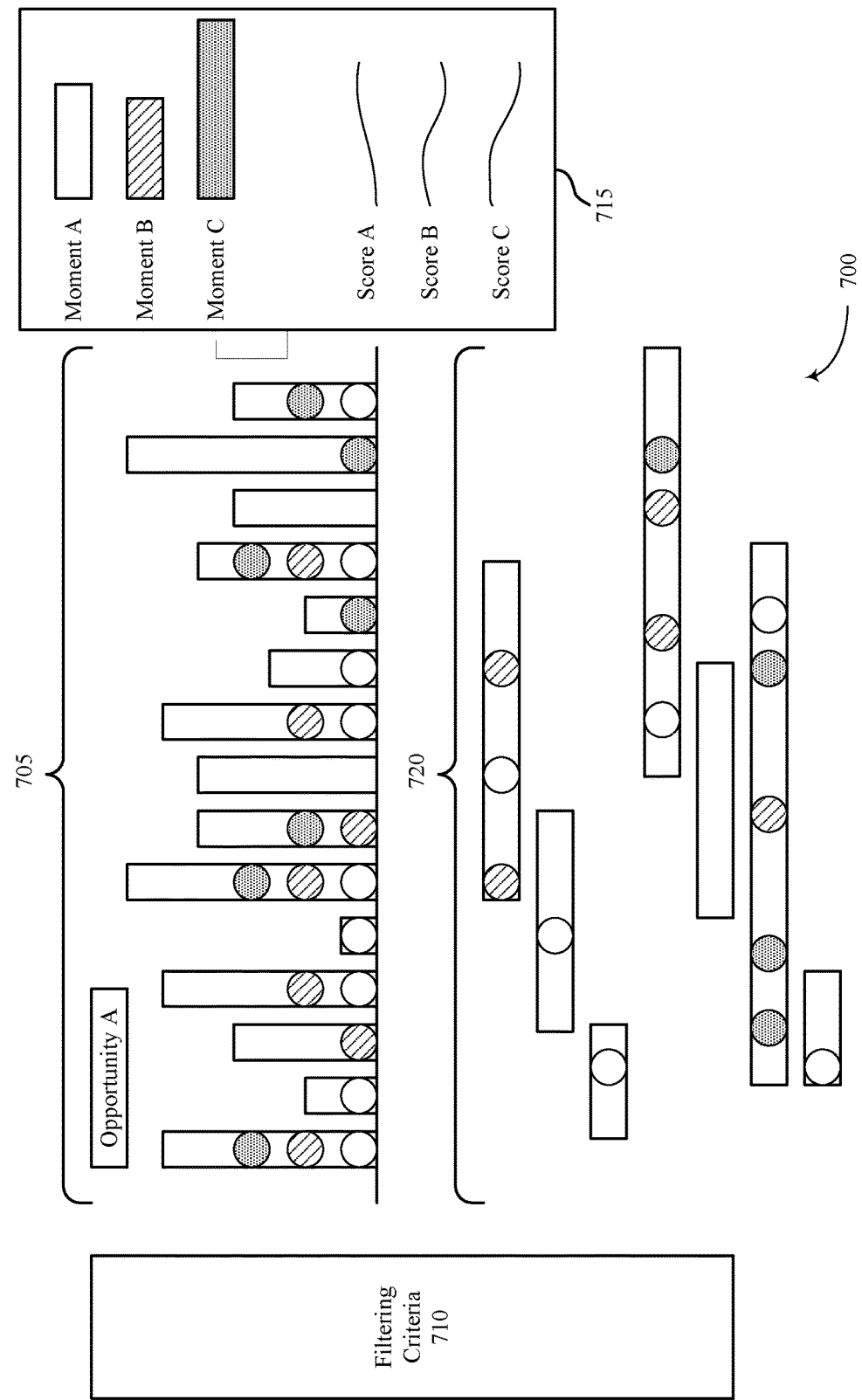

FIG. 7 illustrates an example of a UI 700 that supports displaying an interactive communication time series in accordance with various aspects of the present disclosure. The UI 700 may include a communications timeline 705, a filtering criteria field 710, an inspector 715, and a conversations display 720. In some cases, the UI 700 may display fields, plots, or buttons in addition to the ones described. In other cases, the UI 700 may not display some of the fields or plots described. The communications timeline 705, filtering criteria field 710, and inspector 715 may be examples of, respectively, communications timelines 605-*a* or 605-*b*, the filtering criteria field 610, and the inspector 615 as described with reference to FIG. 6. The UI 700 may be a component of a cloud client 205, as described with reference to FIG. 2.

The UI 700 may display a time series of communication events and corresponding moments in a communications timeline 705. The UI 700 may display a filtered set of communications based on filtering criteria specified by a user. The UI 700 may display the filtering criteria in a filtering criteria field 710. In some cases, the UI 700 may display additional user-specific information in an inspector 715.

In some cases, the user may select a communications timeline 705. The UI 700 may display additional information about the selected communications timeline 705 in a conversations display 720. For example, the UI 700 may display a set of time series of communication events (e.g., a set of conversations) and corresponding moments in the conversations display 720. Each time series of the set of time series of communication events may be represented by a bar. The bar length and position may indicate when the communication events of that time series were transmitted or received. In some cases, a time series may have corresponding moments. The UI 700 may display the corresponding moments (e.g., as dots on the bars), and may indicate a time of the specific communication in which the moment was identified (e.g., based on the position of the dot). In some cases, the user may filter the set of time series of communication events displayed in the conversations display 720. For example, the user may select a search parameter or a time period. The UI 700 may display time series of communication events that correspond to the selected search parameter, and may not display time series of communication events that do not correspond to the selected search parameter. The UI 700 may also display communication events that occurred during the selected time period, and may not display communication events that occurred outside the selected time period.

In an exemplary user case of the present disclosure, a sales manager (e.g., a user) may view all or a portion of communication events for their team at a high level in real time. For example, the UI 700 may display a communications timeline 705 that corresponds to sales communications (e.g., correspondence with a contact, including emails, calendars, phone calls, etc.). The communications timeline 705 may automatically update as communications are transmitted or received. The sales manager may select a filtered set of communications for the UI 700 to display. For example, the sales manager may filter the communications by opportunity or sales representative. In some cases, the sales manager may determine insights based on the information displayed by the UI 700 (e.g., which opportunities are most active or which sales representatives communicate most frequently). In other cases, the UI 700 may display insights to the sales manager.

The communications timeline 705 may also indicate moments identified within the communication events. The moments may correspond to occurrences in a communication event (e.g., an addition of a decision maker, a competitor mention, a pricing mention, etc.). The sales manager may determine insights based on the frequency or timing of the moments displayed by the UI 700 (e.g., in the communications timeline 705, the inspector 715, or the conversations display 720). The UI 700 may also display scores corresponding to the communication events. For example, the UI 700 may display a trend line representing how a score (e.g., agreeability of a communication event) has changed over time in the inspector 715. The sales manager may determine insights based on the scores displayed by the UI 700. In some cases, the sales manager may select a communication event. The UI 700 may display a stored version of the selected communication event for the sales manager to inspect. Based on the insights derived from the UI 700, the sales manager may intervene during a particular interaction (e.g., instruct a sales representative to send a communication or take some other action).

Figure 8:
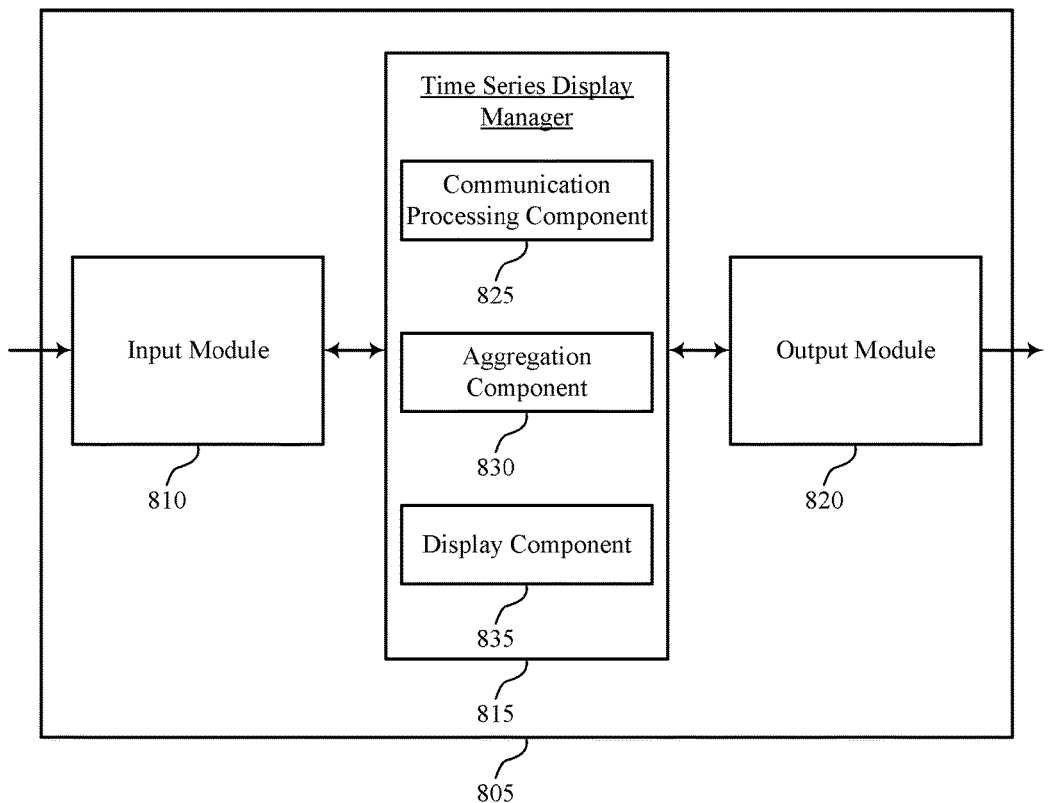
FIGS. 8 through 9 show block diagrams of a device that supports displaying an interactive communication time series in accordance with aspects of the present disclosure.

FIG. 8 shows a block diagram 800 of a system 805 that supports displaying an interactive communication time series in accordance with various aspects of the present disclosure. System 805 may include input module 810, time series display manager 815, and output module 820. System 805 may also include a processor. Each of these components may be in communication with one another (e.g., via one or more buses). In some cases, System 805 may be an example of a user terminal, a database server, or a system containing multiple computing devices. Time series display manager 815 may be an example of aspects of the time series display manager 1015 described with reference to FIG. 10. Time series display manager 815 may also include communication processing component 825, aggregation component 830, and display component 835.

Time series display manager 815 and/or at least some of its various sub-components may be implemented in hardware, software executed by a processor, firmware, or any combination thereof. If implemented in software executed by a processor, the functions of the time series display manager 815 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The time series display manager 815 and/or at least some of its various sub-components may be physically located at various positions, including being distributed such that portions of functions are implemented at different physical locations by one or more physical devices. In some examples, time series display manager 815 and/or at least some of its various sub-components may be a separate and distinct component in accordance with various aspects of the present disclosure. In other examples, time series display manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communication processing component 825 may receive data related to one or more time series of communication moments, where each communication moment of the one or more time series of communication moments includes a property of a communication event derived based on an analysis of the communication event. In some cases, communication processing component 825 may receive at least a new communication event. In some cases, the property of the communication event includes an occurrence associated with the communication event, a score associated with the communication event, or a combination thereof. In some cases, the communication event includes an email, a calendar event, a service ticket, a short message service (SMS) text message, a voice call, a social media message, or a combination thereof.

Aggregation component 830 may process the data to generate aggregate type information corresponding to one or more types of the one or more time series of communication moments. In some cases, the aggregate type information indicates a number of occurrences of communication moments of a particular type, a trend line corresponding to communication moments of a particular type, or a combination thereof.

Display component 835 may display at least a portion of the one or more time series of communication moments and the aggregate type information to a user, display one or more time series of communication events associated with the one or more time series of communication moments, display a modified portion of the one or more time series of communication moments based on an input, display content associated with a particular communication event, and display an updated portion of the one or more time series of communication moments based on a new communication event.

Figure 9:
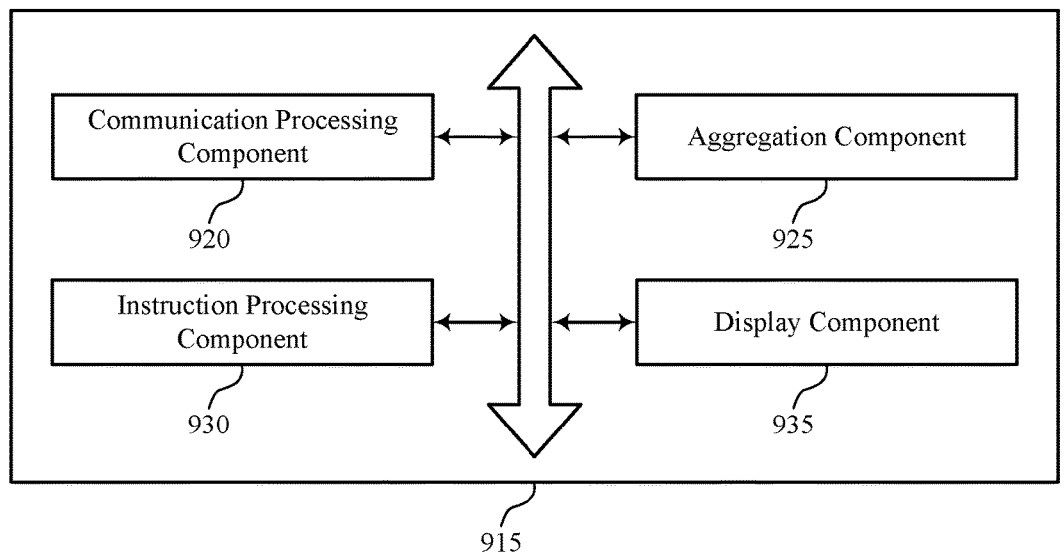

FIG. 9 shows a block diagram 900 of a time series display manager 915 that supports displaying an interactive communication time series in accordance with various aspects of the present disclosure. The time series display manager 915 may be an example of aspects of a time series display manager 1015 described with reference to FIGS. 8 and 10. The time series display manager 915 may include communication processing component 920, aggregation component 925, display component 930, and instruction processing component 935. Each of these modules may communicate, directly or indirectly, with one another (e.g., via one or more buses).

Communication processing component 920 may receive data related to one or more time series of communication moments, where each communication moment of the one or more time series of communication moments includes a property of a communication event derived based on an analysis of the communication event. In some cases, communication processing component 920 may receive at least a new communication event. In some cases, the property of the communication event includes an occurrence associated with the communication event, a score associated with the communication event, or a combination thereof. In some cases, the communication event includes an email, a calendar event, a service ticket, an SMS text message, a voice call, a social media message, or a combination thereof.

Aggregation component 925 may process the data to generate aggregate type information corresponding to one or more types of the one or more time series of communication moments. In some cases, the aggregate type information indicates a number of occurrences of communication moments of a particular type, a trend line corresponding to communication moments of a particular type, or a combination thereof.

Instruction processing component 930 may receive an input from a user to modify a timescale of the one or more time series of communication moments, receive an input from the user to display a subset of communication moments from the one or more time series of communication moments, and receive an input from the user to display a particular communication event associated with a particular communication moment.

Display component 935 may display at least a portion of the one or more time series of communication moments and the aggregate type information to the user, display one or more time series of communication events associated with the one or more time series of communication moments, display a modified portion of the one or more time series of communication moments based on the input, display content associated with the particular communication event, and display an updated portion of the one or more time series of communication moments based on the new communication event.

Figure 10:
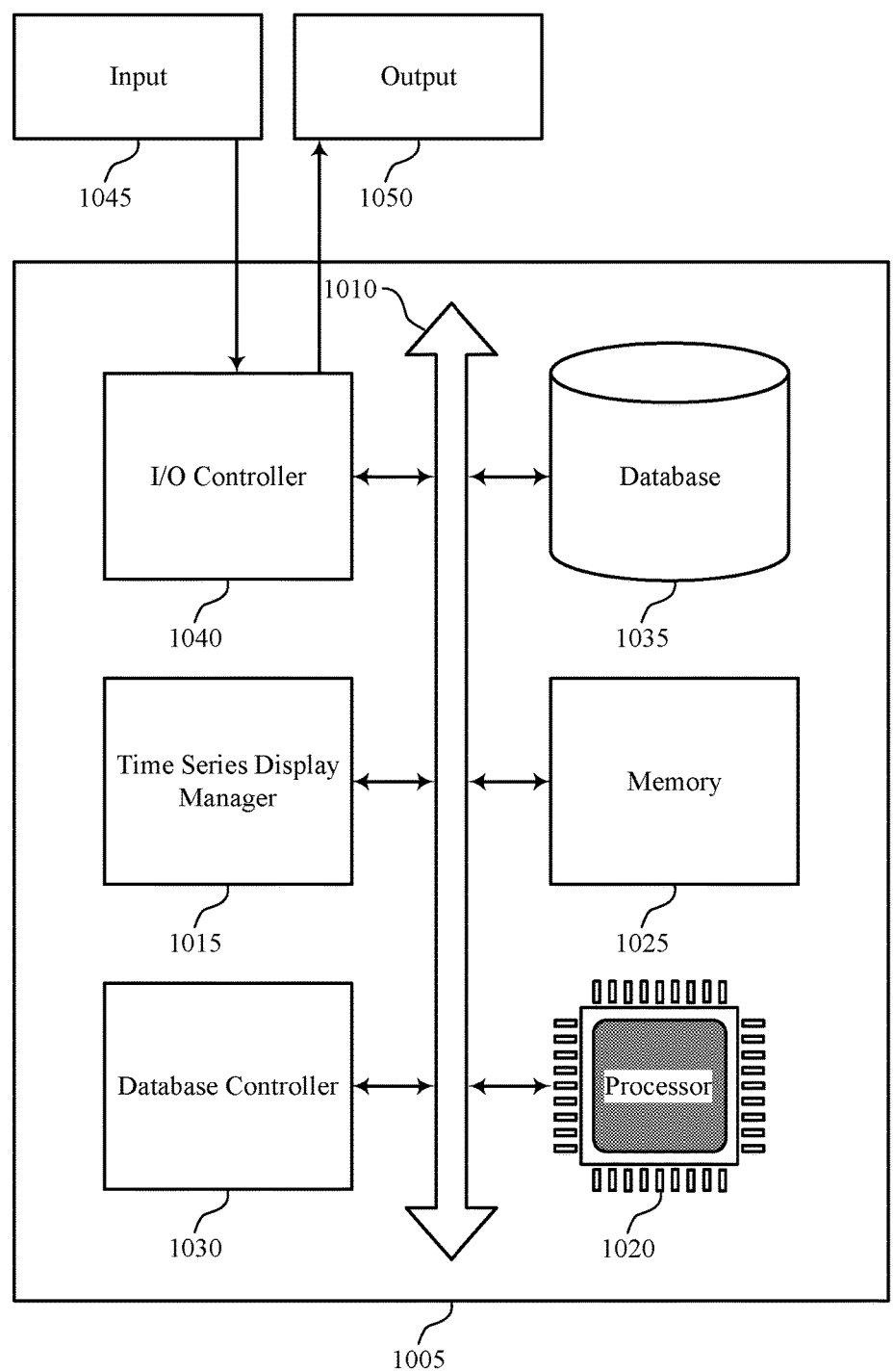
FIG. 10 illustrates a block diagram of an environment including a time series display manager that supports displaying an interactive communication time series in accordance with aspects of the present disclosure.

FIG. 10 shows a diagram of an environment 1000 including a system 1005 that supports displaying an interactive communication time series in accordance with various aspects of the present disclosure. System 1005 may be an example of or include the components of system 125 as described above, e.g., with reference to FIG. 1. Device 1005 may include components for bi-directional data communications including components for transmitting and receiving communications, including time series display manager 1015, processor 1020, memory 1025, database controller 1030, database 1035, and I/O controller 1040. These components may be in electronic communication via one or more busses (e.g., bus 1010).

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting displaying an interactive communication time series).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware and/or software operation such as the interaction with peripheral components or devices.

Database controller 1030 may manage data storage and processing in database 1035. In some cases, a user may interact with database controller 1030. In other cases, database controller 1030 may operate automatically without user interaction. Database 1035 may be an example of a single database, a distributed database, multiple distributed databases, or an emergency backup database.

I/O controller 1040 may manage input and output signals for device 1005. I/O controller 1040 may also manage peripherals not integrated into device 1005. In some cases, I/O controller 1040 may represent a physical connection or port to an external peripheral. In some cases, I/O controller 1040 may utilize an operating system such as iOS®, ANDROID®, MS-DOS®, MS-WINDOWS®, OS/2®, UNIX®, LINUX®, or another known operating system. In other cases, I/O controller 1040 may represent or interact with a modem, a keyboard, a mouse, a touchscreen, or a similar device. In some cases, I/O controller 1040 may be implemented as part of a processor. In some cases, a user may interact with device 1005 via I/O controller 1040 or via hardware components controlled by I/O controller 1040.

Figure 11:
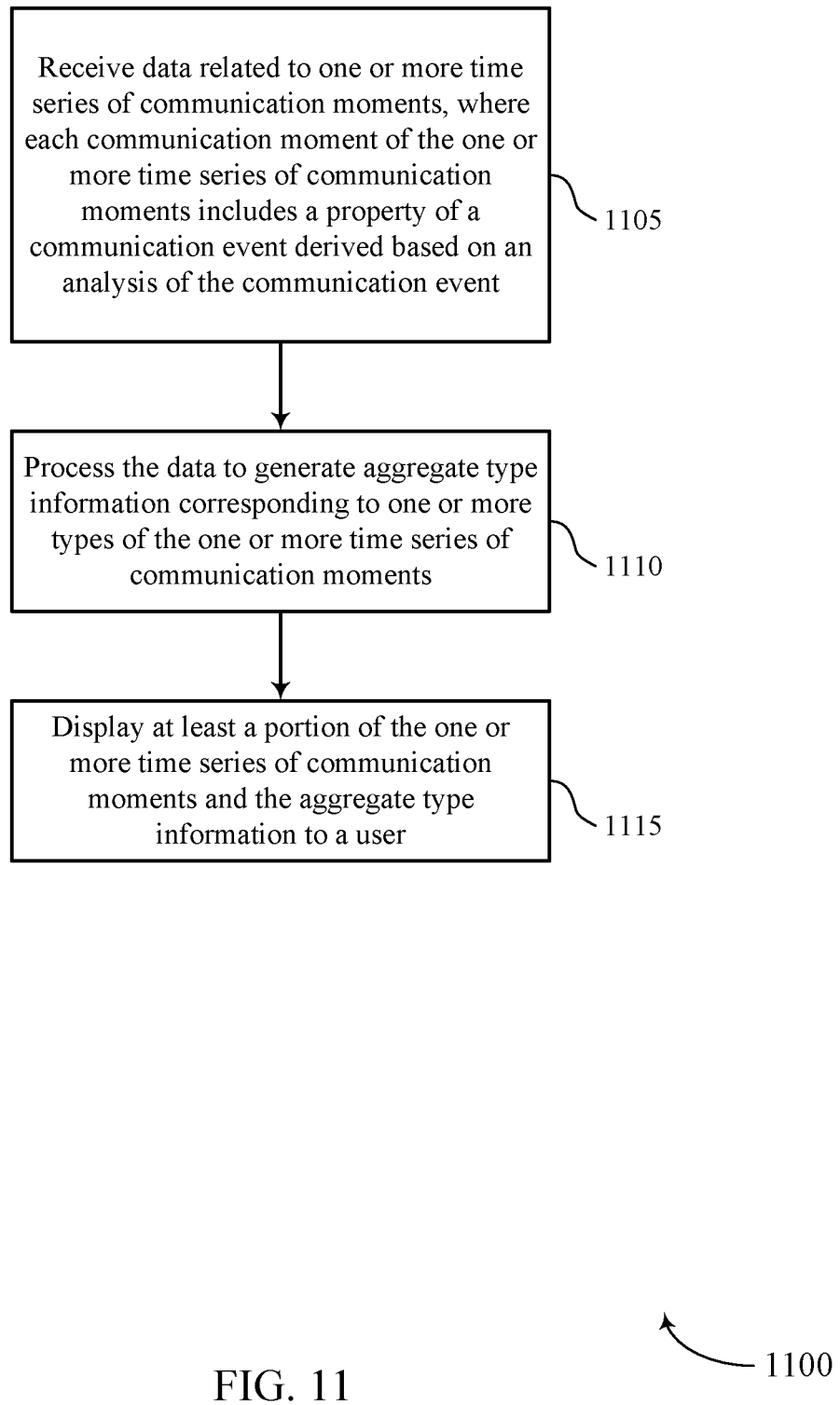
FIGS. 11 through 12 illustrate methods for displaying an interactive communication time series in accordance with aspects of the present disclosure.

FIG. 11 shows a flowchart illustrating a method 1100 for displaying an interactive communication time series in accordance with various aspects of the present disclosure. The operations of method 1100 may be implemented by a time series display manager or its components as described herein. For example, the operations of method 1100 may be performed by a time series display manager 815, 915, or 1015 as described with reference to FIGS. 8 through 10. In some examples, a time series display manager 815, 915, or 1015 may execute a set of codes to control the functional elements of the device to perform the functions described below. Additionally or alternatively, the time series display manager 815, 915, or 1015 may perform aspects of the functions described below using special-purpose hardware.

At block 1105 the time series display manager 815, 915, or 1015 may receive data related to one or more time series of communication moments, wherein each communication moment of the one or more time series of communication moments comprises a property of a communication event derived based at least in part on an analysis of the communication event. The operations of block 1105 may be performed according to the methods described with reference to FIGS. 1 through 7. In certain examples, aspects of the operations of block 1105 may be performed by a communication processing component as described with reference to FIGS. 8 through 10.

At block 1110 the time series display manager 815, 915, or 1015 may process the data to generate aggregate type information corresponding to one or more types of the one or more time series of communication moments. The operations of block 1110 may be performed according to the methods described with reference to FIGS. 1 through 7. In certain examples, aspects of the operations of block 1110 may be performed by an aggregation component as described with reference to FIGS. 8 through 10.

At block 1115 the time series display manager 815, 915, or 1015 may display at least a portion of the one or more time series of communication moments and the aggregate type information to a user. The operations of block 1115 may be performed according to the methods described with reference to FIGS. 1 through 7. In certain examples, aspects of the operations of block 1115 may be performed by a display component as described with reference to FIGS. 8 through 10.

Figure 12:
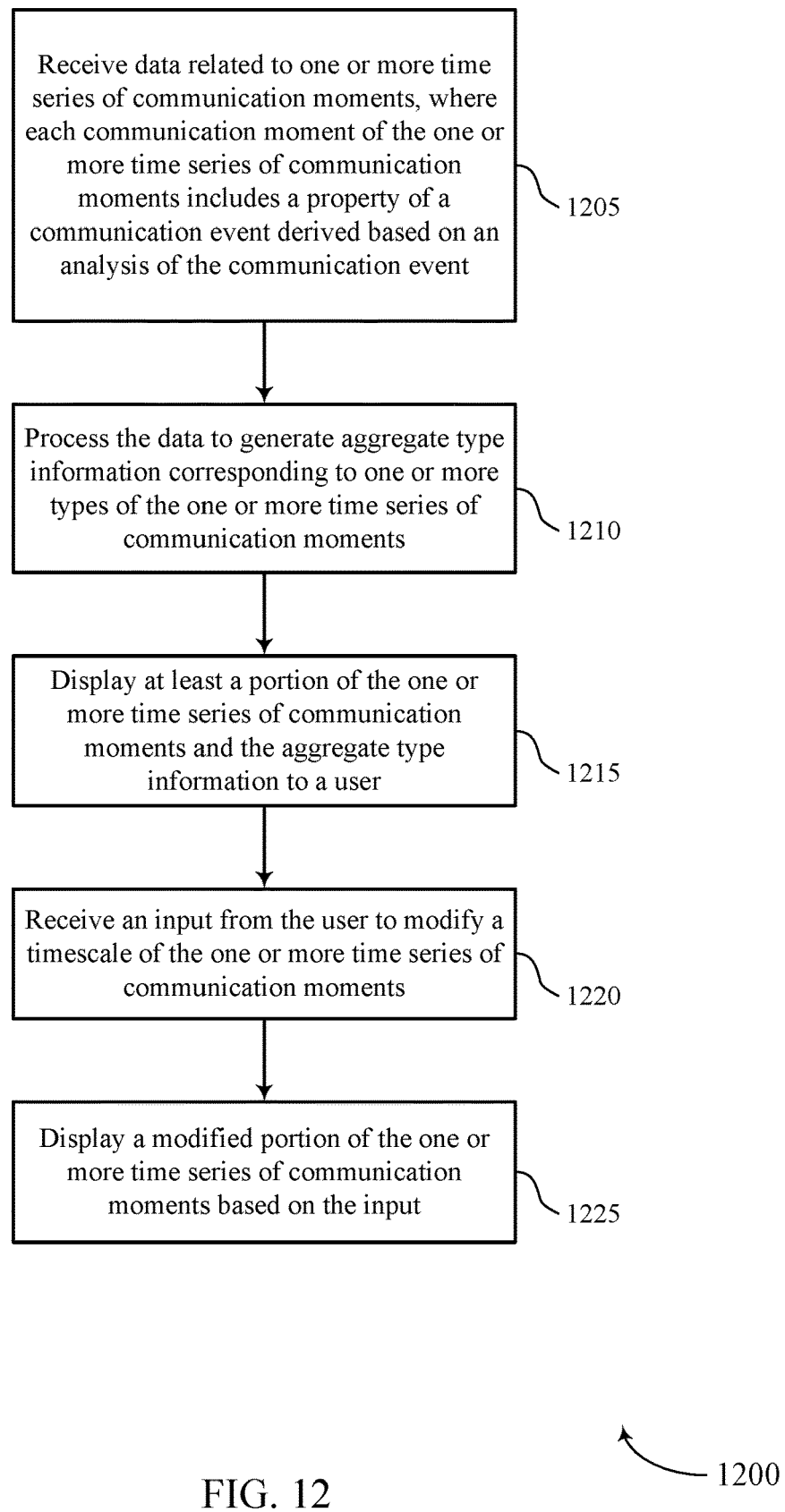

FIG. 12 shows a flowchart illustrating a method 1200 for displaying an interactive communication time series in accordance with various aspects of the present disclosure. The operations of method 1200 may be implemented by a time series display manager or its components as described herein. For example, the operations of method 1200 may be performed by a time series display manager 815, 915, or 1015 as described with reference to FIGS. 8 through 10. In some examples, a time series display manager 815, 915, or 1015 may execute a set of codes to control the functional elements of the device to perform the functions described below. Additionally or alternatively, the time series display manager 815, 915, or 1015 may perform aspects of the functions described below using special-purpose hardware.

At block 1205 the time series display manager 815, 915, or 1015 may receive data related to one or more time series of communication moments, wherein each communication moment of the one or more time series of communication moments comprises a property of a communication event derived based at least in part on an analysis of the communication event. The operations of block 1205 may be performed according to the methods described with reference to FIGS. 1 through 7. In certain examples, aspects of the operations of block 1205 may be performed by a communication processing component as described with reference to FIGS. 8 through 10.

At block 1210 the time series display manager 815, 915, or 1015 may process the data to generate aggregate type information corresponding to one or more types of the one or more time series of communication moments. The operations of block 1210 may be performed according to the methods described with reference to FIGS. 1 through 7. In certain examples, aspects of the operations of block 1210 may be performed by an aggregation component as described with reference to FIGS. 8 through 10.

At block 1215 the time series display manager 815, 915, or 1015 may display at least a portion of the one or more time series of communication moments and the aggregate type information to a user. The operations of block 1215 may be performed according to the methods described with reference to FIGS. 1 through 7. In certain examples, aspects of the operations of block 1215 may be performed by a display component as described with reference to FIGS. 8 through 10.

At block 1220 the time series display manager 815, 915, or 1015 may receive an input from the user to modify a timescale of the one or more time series of communication moments. The operations of block 1220 may be performed according to the methods described with reference to FIGS. 1 through 7. In certain examples, aspects of the operations of block 1220 may be performed by an instruction processing component as described with reference to FIGS. 8 through 10.

At block 1225 the time series display manager 815, 915, or 1015 may display a modified portion of the one or more time series of communication moments based at least in part on the input. The operations of block 1225 may be performed according to the methods described with reference to FIGS. 1 through 7. In certain examples, aspects of the operations of block 1225 may be performed by the display component as described with reference to FIGS. 8 through 10.

A method of communication data processing is described. The method may include receiving data related to one or more time series of communication moments, wherein each communication moment of the one or more time series of communication moments comprises a property of a communication event derived based at least in part on an analysis of the communication event, processing the data to generate aggregate type information corresponding to one or more types of the one or more time series of communication moments, and displaying at least a portion of the one or more time series of communication moments and the aggregate type information to a user.

Another apparatus for communication data processing is described. The apparatus may include a processor, memory in electronic communication with the processor, and instructions stored in the memory. The instructions may be operable to cause the processor to receive data related to one or more time series of communication moments, wherein each communication moment of the one or more time series of communication moments comprises a property of a communication event derived based at least in part on an analysis of the communication event, process the data to generate aggregate type information corresponding to one or more types of the one or more time series of communication moments, and display at least a portion of the one or more time series of communication moments and the aggregate type information to a user.

A non-transitory computer readable medium for communication data processing is described. The non-transitory computer-readable medium may include instructions operable to cause a processor to receive data related to one or more time series of communication moments, wherein each communication moment of the one or more time series of communication moments comprises a property of a communication event derived based at least in part on an analysis of the communication event, process the data to generate aggregate type information corresponding to one or more types of the one or more time series of communication moments, and display at least a portion of the one or more time series of communication moments and the aggregate type information to a user.

Some examples of the method, apparatus, and non-transitory computer-readable medium described above may further include processes, features, means, or instructions for displaying one or more time series of communication events associated with the one or more time series of communication moments.

Some examples of the method, apparatus, and non-transitory computer-readable medium described above may further include processes, features, means, or instructions for receiving an input from the user to modify a timescale of the one or more time series of communication moments. Some examples of the method, apparatus, and non-transitory computer-readable medium described above may further include processes, features, means, or instructions for displaying a modified portion of the one or more time series of communication moments based at least in part on the input.

Some examples of the method, apparatus, and non-transitory computer-readable medium described above may further include processes, features, means, or instructions for receiving an input from the user to display a subset of communication moments from the one or more time series of communication moments. Some examples of the method, apparatus, and non-transitory computer-readable medium described above may further include processes, features, means, or instructions for displaying a modified portion of the one or more time series of communication moments based at least in part on the input.

Some examples of the method, apparatus, and non-transitory computer-readable medium described above may further include processes, features, means, or instructions for receiving an input from the user to display a particular communication event associated with a particular communication moment. Some examples of the method, apparatus, and non-transitory computer-readable medium described above may further include processes, features, means, or instructions for displaying content associated with the particular communication event.

Some examples of the method, apparatus, and non-transitory computer-readable medium described above may further include processes, features, means, or instructions for receiving at least a new communication event. Some examples of the method, apparatus, and non-transitory computer-readable medium described above may further include processes, features, means, or instructions for displaying an updated portion of the one or more time series of communication moments based at least in part on the new communication event.

In some examples of the method, apparatus, and non-transitory computer-readable medium described above, the aggregate type information indicates a number of occurrences of communication moments of a particular type, a trend line corresponding to communication moments of a particular type, or a combination thereof.

In some examples of the method, apparatus, and non-transitory computer-readable medium described above, the property of the communication event comprises an occurrence associated with the communication event, a score associated with the communication event, or a combination thereof.

In some examples of the method, apparatus, and non-transitory computer-readable medium described above, the communication event comprises an email, a calendar event, a service ticket, a short message service (SMS) text message, a voice call, a social media message, or a combination thereof.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for communication data processing, comprising:
   receiving data related to one or more time series of communication moments, wherein each communication moment of the one or more time series of communication moments comprises a property of a communication event derived based at least in part on a natural language processing (NLP) analysis of the communication event;
   processing the data to generate aggregate type information corresponding to one or more types of the one or more time series of communication moments; and
   displaying at least a portion of the one or more time series of communication moments and the aggregate type information to a user in a user interface as an interactive timeline of communications comprising indications of one or more communication events, one or more communication moments, the aggregate type information, or a combination thereof, wherein the displaying comprises:
      displaying the one or more communication events associated with the portion of the one or more time series of communication moments as one or more bars on the interactive timeline of communications; and
      displaying the one or more communication moments as one or more dots in a bar of the one or more bars on the interactive timeline of communications.

2. The method of claim 1, further comprising:
   receiving an additional input from the user to modify a timescale of the one or more time series of communication moments; and
   displaying a modified portion of the one or more time series of communication moments based at least in part on the additional input.

3. The method of claim 1, further comprising:
   receiving an additional input from the user to display a subset of communication moments from the one or more time series of communication moments, wherein the additional input comprises a filtering parameter indicating a specific user associated with the subset of communication moments, a type of communication event, a type of communication moment, or a combination thereof; and
   displaying a filtered portion of the one or more time series of communication moments based at least in part on the additional input.

4. The method of claim 1, further comprising:
   receiving at least a new communication event; and
   displaying an updated portion of the one or more time series of communication moments based at least in part on the new communication event.

5. The method of claim 1, wherein the aggregate type information indicates a number of occurrences of communication moments of a particular type, a trend line corresponding to communication moments of a particular type, or a combination thereof.

6. The method of claim 1, wherein the property of the communication event comprises an occurrence associated with the communication event, a score associated with the communication event, or a combination thereof.

7. The method of claim 1, wherein the communication event comprises an email, a calendar event, a service ticket, a short message service (SMS) text message, a voice call, a social media message, or a combination thereof.

8. An apparatus for communication data processing, in a system comprising:
   a processor;
   memory in electronic communication with the processor; and
   instructions stored in the memory and operable, when executed by the processor, to cause the apparatus to:
      receive data related to one or more time series of communication moments, wherein each communication moment of the one or more time series of communication moments comprises a property of a communication event derived based at least in part on a natural language processing (NLP) analysis of the communication event;
      process the data to generate aggregate type information corresponding to one or more types of the one or more time series of communication moments; and
      display at least a portion of the one or more time series of communication moments and the aggregate type information to a user in a user interface as an interactive timeline of communications comprising indications of one or more communication events, one or more communication moments, the aggregate type information, or a combination thereof, wherein the displaying comprises:
         displaying the one or more communication events associated with the portion of the one or more time series of communication moments as one or more bars on the interactive timeline of communications; and displaying the one or more communication moments as one or more dots in a bar of the one or more bars on the interactive timeline of communications.

9. The apparatus of claim 8, wherein the instructions are further executable by the processor to:
receive an additional input from the user to modify a timescale of the one or more time series of communication moments; and
display a modified portion of the one or more time series of communication moments based at least in part on the additional input.

10. The apparatus of claim 8, wherein the instructions are further executable by the processor to:
receive an additional input from the user to display a subset of communication moments from the one or more time series of communication moments, wherein the additional input comprises a filtering parameter indicating a specific user associated with the subset of communication moments, a type of communication event, a type of communication moment, or a combination thereof; and
display a filtered portion of the one or more time series of communication moments based at least in part on the additional input.

11. The apparatus of claim 8, wherein the instructions are further executable by the processor to:
receive at least a new communication event; and
display an updated portion of the one or more time series of communication moments based at least in part on the new communication event.

12. A non-transitory computer readable medium storing code for communication data processing, the code comprising instructions executable by a processor to:
receive data related to one or more time series of communication moments, wherein each communication moment of the one or more time series of communication moments comprises a property of a communication event derived based at least in part on a natural language processing (NLP) analysis of the communication event;
process the data to generate aggregate type information corresponding to one or more types of the one or more time series of communication moments; and
display at least a portion of the one or more time series of communication moments and the aggregate type information to a user in a user interface as an interactive timeline of communications comprising indications of one or more communication events, one or more communication moments, the aggregate type information, or a combination thereof, wherein the displaying comprises:
displaying the one or more communication events associated with the portion of the one or more time series of communication moments as one or more bars on the interactive timeline of communications; and displaying the one or more communication moments as one or more dots in a bar of the one or more bars on the interactive timeline of communications.

13. The non-transitory computer-readable medium of claim 12, wherein the instructions are further executable by the processor to:
receive an additional input from the user to modify a timescale of the one or more time series of communication moments; and
display a modified portion of the one or more time series of communication moments based at least in part on the additional input.

14. The non-transitory computer-readable medium of claim 12, wherein the instructions are further executable by the processor to:
receive an additional input from the user to display a subset of communication moments from the one or more time series of communication moment, wherein the additional input comprises a filtering parameter indicating a specific user associated with the subset of communication moments, a type of communication event, a type of communication moment, or a combination thereof, and
display a filtered portion of the one or more time series of communication moments based at least in part on the additional input.

15. The method of claim 1, further comprising:
receiving, in the user interface, an input from the user to display a particular communication event associated with a particular communication moment;
retrieving, from data storage, content associated with the particular communication event; and
displaying the content associated with the particular communication event to the user in the user interface.

16. The method of claim 1, further comprising:
displaying, in the user interface, user-specific information corresponding to the user.

17. The method of claim 15, wherein displaying the content associated with the particular communication event comprises:
displaying an email to the user in the user interface.

18. The apparatus of claim 8, wherein the instructions are further executable by the processor to:
receive, in the user interface, an input from the user to display a particular communication event associated with a particular communication moment;
retrieve, from data storage, content associated with the particular communication event; and
display the content associated with the particular communication event to the user in the user interface.

19. The non-transitory computer-readable medium of claim 12, wherein the instructions are further executable by the processor to:
receive, in the user interface, an input from the user to display a particular communication event associated with a particular communication moment;
retrieve, from data storage, content associated with the particular communication event; and
display the content associated with the particular communication event to the user in the user interface.

* * * * *